US008402439B2

(12) United States Patent
Gulwani et al.

(10) Patent No.: US 8,402,439 B2
(45) Date of Patent: Mar. 19, 2013

(54) PROGRAM ANALYSIS AS CONSTRAINT SOLVING

(75) Inventors: Sumit Gulwani, Redmond, WA (US); Saurabh Srivastava, Baltimore, MD (US); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1297 days.

(21) Appl. No.: 12/147,908

(22) Filed: Jun. 27, 2008

(65) Prior Publication Data

US 2009/0326907 A1 Dec. 31, 2009

(51) Int. Cl.
G06F 9/44 (2006.01)
(52) U.S. Cl. ....................................................... 717/126
(58) Field of Classification Search .................... 717/126
See application file for complete search history.

(56) References Cited

U.S. PATENT DOCUMENTS

| | | | |
|---|---|---|---|
| 5,867,649 A * | 2/1999 | Larson ........................... | 709/201 |
| 6,553,362 B2 | 4/2003 | Saxe et al. | |
| 7,024,661 B2 * | 4/2006 | Leino et al. .................... | 717/126 |
| 7,089,542 B2 | 8/2006 | Brand et al. | |
| 7,120,902 B2 * | 10/2006 | Flanagan et al. .............. | 717/130 |
| 7,283,945 B2 * | 10/2007 | Rajan ............................. | 703/17 |
| 7,454,399 B2 * | 11/2008 | Matichuk ........................ | 706/53 |
| 7,574,695 B2 * | 8/2009 | Chander et al. ................ | 717/126 |
| 7,797,687 B2 * | 9/2010 | Tillmann et al. .............. | 717/131 |
| 8,046,746 B2 * | 10/2011 | Tillmann et al. .............. | 717/133 |
| 2002/0046393 A1 * | 4/2002 | Leino et al. ........................ | 717/7 |
| 2002/0112201 A1 * | 8/2002 | Flanagan et al. ................. | 714/42 |
| 2002/0133806 A1 * | 9/2002 | Flanagan et al. .............. | 717/123 |
| 2004/0019468 A1 | 1/2004 | De Moura et al. | |
| 2005/0010907 A1 * | 1/2005 | Namjoshi ...................... | 717/124 |
| 2005/0027495 A1 * | 2/2005 | Matichuk ........................... | 703/2 |
| 2005/0166095 A1 * | 7/2005 | Chander et al. ................. | 714/38 |
| 2005/0166167 A1 | 7/2005 | Ivancic et al. | |
| 2005/0229044 A1 | 10/2005 | Ball | |
| 2006/0247907 A1 | 11/2006 | Qadeer et al. | |
| 2006/0282807 A1 | 12/2006 | Ivancic et al. | |
| 2007/0033576 A1 * | 2/2007 | Tillmann et al. .............. | 717/124 |

(Continued)

OTHER PUBLICATIONS

Dirk Beyer, Thomas A. Henzinger, Rupak Majumdar, and Andrey Rybalchenko. 2007. Path invariants. SIGPLAN Not. 42, 6 (Jun. 2007), 300-309. DOI=10.1145/1273442.1250769 http://doi.acm.org/10.1145/1273442.1250769.*

(Continued)

*Primary Examiner* — Wei Zhen
*Assistant Examiner* — Matthew Brophy
(74) *Attorney, Agent, or Firm* — Gonzalez Saggio & Harlan LLP

(57) ABSTRACT

Described is a technology by which program analysis uses rich invariant templates that may specify an arbitrary Boolean combination of linear inequalities for program verification. Also described is choosing a cut-set that identifies program locations, each of which is associated with an invariant template. The verification generates second-order constraints, converts second-order logic formula based on those constraints into first-order logic formula, then converts the first-order logic formula into a quantifier-free formula, which is then converted into a Boolean satisfiability formula. Off-the-shelf constraint solvers may then be applied to the Boolean satisfiability formula to generate program analysis results. Various templates may be used to convert the second-order logic formula into the first-order logic formula. Further described are interprocedural analysis and the determination of weakest precondition and strongest postcondition with applications to termination analysis, timing bounds analysis, and generation of most-general counterexamples for both termination and safety properties.

18 Claims, 13 Drawing Sheets

U.S. PATENT DOCUMENTS

| | | | | |
|---|---|---|---|---|
| 2007/0088740 | A1* | 4/2007 | Davies et al. | 707/103 R |
| 2007/0168988 | A1 | 7/2007 | Eisner et al. | |
| 2007/0277163 | A1 | 11/2007 | Avresky | |
| 2007/0299793 | A1 | 12/2007 | Musuvathi et al. | |
| 2008/0320486 | A1* | 12/2008 | Bose et al. | 718/105 |
| 2009/0007038 | A1* | 1/2009 | Wang et al. | 716/5 |
| 2010/0281306 | A1* | 11/2010 | Sinha | 714/38 |

OTHER PUBLICATIONS

Randal E. Bryant, Daniel Kroening, J. Ouaknine, Sanjit A. Seshia, Ofer Strichman, and Bryan Brady. 2007. Deciding bit-vector arithmetic with abstraction. In Proceedings of the 13th international conference on Tools and algorithms for the construction and analysis of systems (TACAS'07), Orna Grumberg and Michael Huth (Eds.). Springer-Verlag, Berlin.*

Colón, Michael; Sankaranarayanan, Sriram; Sipma, Henny "Linear Invariant Generation Using Non-linear Constraint Solving" Computer Aided Verification Lecture Notes in Computer Science 2003. Springer Berlin / Heidelberg p. 420-432.*

Sumit Gulwani and Ashish Tiwari. 2007. Computing procedure summaries for interprocedural analysis. In Proceedings of the 16th European conference on Programming (ESOP'07), Rocco De Nicola (Ed.). Springer-Verlag, Berlin, Heidelberg, 253-267.*

Wei-Ngan Chin, Siau-Cheng Khoo, and Dana N. Xu. 2001. Deriving Pre-conditions for Array Bound Check Elimination. In Proceedings of the Second Symposium on Programs as Data Objects (PADO '01), Olivier Danvy and Andrzej Filinski (Eds.). Springer-Verlag, London, UK, 2-24.*

Fabian Bannwart and Peter Mueller. 2005. A Program Logic for Bytecode. Electron. Notes Theor. Comput. Sci. 141, 1 (Dec. 2005), 255-273. DOI=10.1016/j.entcs.2005.02.026 http://dx.doi.org/10.1016/j.entcs.2005.02.026.*

B. Lisper. Fully Automatic, Parametric Worst-Case Execution Time Analysis. In Proc. WCET '03: Intl. Workshop on Worst-Case Execution Time Analysis, pp. 99-102, 2003.).*

Aaron R. Bradley and Zohar Manna. 2007. Checking Safety by Inductive Generalization of Counterexamples to Induction. In Proceedings of the Formal Methods in Computer Aided Design (FMCAD '07). IEEE Computer Society, Washington, DC, USA, 173-180.*

Anirban Majumdar, Clark Thomborson, and Stephen Drape. 2006. A survey of control-flow obfuscations. In Proceedings of the Second international conference on Information Systems Security (ICISS'06), Aditya Bagchi and Vijayalakshmi Atluri (Eds.). Springer-Verlag, Berlin, Heidelberg, 353-356.*

Ball, Thomas Formalizing Counterexample-Driven Refinement with Weakest Preconditions Engineering Theories of Software Intensive Systems. NATO Science Series 2005 Springer Netherlands p. 121-139 vol. 195 <http://www.springerlink.com/content/hk552416k67w4560/>.*

Csallner, et al., "DySy: Dynamic Symbolic Execution for Invariant Inference", Microsoft Research Technical Report, 2007, pp. 1-10.

Xie, et al., "Path Sensitive Program Analysis Using Boolean Satisfiability", 2002, ACM, pp. 10.

Chauhan, et al., "Automated Abstraction Refinement for Model Checking Large State Spaces using SAT based Conflict Analysis", Proceedings of the 4th International Conference on Formal Methods in Computer-Aided Design, vol. 2517, 2002, pp. 1-18.

Jackson, et al., "Finding Bugs with a Constraint Solver", ACM SIGSOFT Software Engineering Notes, vol. 25, No. 5, 2000, pp. 12.

Balaban, et al., "Ranking Abstraction of Recursive Programs", Springer-Verlag Berlin Heidelberg, 2006, pp. 267-281.

Berdine, et al., "Variance Analyses from Invariance Analyses", Principles of Programming Languages, 2007, ACM, pp. 211-224.

Beyer, et al., "Invariant Synthesis for Combined Theories", In Proceedings of the Eighth International Conference on Verification, Model Checking, and Abstract Interpretation (VMCAI 2007, Jan. 14-16), LNCS 4349, pp. 378-394, 2007. Springer-Verlag, pp. 17.

Beyer, et al., "Path Invariants", Technical Report, Models and Theory of Computation Laboratory, Dec. 22, 2006, pp. 16.

Bradley, et al., "Verification Constraint Problems with Strengthening", Springer Berlin / Heidelberg, vol. 4281, 2006, pp. 15, Jun. 12, 2012.

Bradley, et al., "Linear Ranking with Reachability", Springer Berlin / Heidelberg, vol. 3576, 2005, pp. 1-55.

Colon, et al., "Linear Invariant Generation Using Non-linear Constraint Solving", Springer-Verlag Berlin Heidelberg 2003, pp. 420-432.

Cousot, et al., "A Unified Lattice Model for Static Analysis of Programs by Construction or Approximation of Fixpoints", 1977, ACM, pp. 238-252.

Gonnord, et al., "Combining Widening and Acceleration in Linear Relation Analysis", Springer Berlin / Heidelberg, vol. 4134, 2006, pp. 1-17.

Gulavani, et al., "Automatically Refining Abstract Interpretations", Jul. 2007, Technical Report, pp. 20.

Gulavani, et al., "Counterexample Driven Refinement for Abstract Interpretation", LNCS.3920, Springer-Verlag Berlin Heidelberg, 2006, pp. 474-488.

Gupta, et al., "Proving Non-Termination", 2008, ACM, pp. 12.

Kapur, "Automatically Generating Loop Invariants Using Quantifier Elimination", Applications of Computer Algebra (ACA 2004), ACA & Lamar University, 2004, pp. 1-17.

Kildall, "A Unified Approach to Global Program Optimization", Proceedings of the 1st annual ACM SIGACT-SIGPLAN Symposium on Principles of Programming Languages, ACM, 1973, pp. 194-206.

Manna, et al., "Formalization of Properties of Functional Programs", Journal of the Association for Computing Machinery, vol. 17, No. 3, Jul. 1970, pp. 555-569.

Muller-Olm, et al., "Precise Interprocedural Analysis through Linear Algebra", ACM, 2004, pp. 12.

Muller-Olm, et al., "Interprocedural Analysis (Almost) for Free", 2004, pp. 1-15.

Podelski, et al., "A Complete Method for the Synthesis of Linear Ranking Functions", Springer Berlin / Heidelberg, vol. 2937, 2004, pp. 239-251.

Sankaranarayanan, et al., "Non-linear Loop Invariant Generation using Gröbner Bases", 2004, ACM, pp. 318-329.

Sankaranarayanan, et al., "Scalable Analysis of Linear Systems Using Mathematical Programming", vol. 3385, Springer-Verlag Berlin Heidelberg, 2005, pp. 25-41.

Seidl, et al., "Interprocedurally Analysing Linear Inequality Relations", vol. 4421, Springer-Verlag Berlin Heidelberg, 2007, pp. 284-299.

Wang, et al., "Using Counterexamples for Improving the Precision of Reachability Computation with Polyhedra", Springer Berlin / Heidelberg, vol. 4590, 2007, pp. 1-14.

* cited by examiner

```
PV1 (int y) {
    x := -50;
    while (x < 0) {
        x := x + y;
        y++;
    }
    assert(y > 0)
}
```

$$\forall_{x,y} \phi(I):$$
$$\text{true} \Rightarrow I[-50/x]$$
$$I \wedge x < 0 \Rightarrow I[(y+1)/y, (x+y)/x]$$
$$I \wedge x \geq 0 \Rightarrow y > 0$$

```
    PV2() {
1       x := 0; y := 0;
2       while (true) {
3           if (x ≤ 50)
4               y++;
5           else
6               y--;
7           if (y < 0)
8               break;
9           x++;
10      }
11      assert(x = 102)
    }
```

FIG. 3

```
IP1() {
    x := 5;  y := 3;
    result := Add(x, y);
    assert(result = 8);
}
Add(int i, j) {
    if i ≤ 0
        ret := j;
    else
        b := i − 1;
        c := j + 1;
        ret := Add(b, c);
    return ret;
}
```

*FIG. 4A*

```
IP2() {
    result :=M(19)+M(119);
    assert(result = 200);
}
M(int n) {
    if(n > 100)
        return n − 10;
    else
        return M(M(n + 11));
}
```

*FIG. 4B*

```
WP1(int i, j) {
    x := y := 0;
    while (x ≤ 100) {
        x := x + i;
        y := y + j;
    }
    assert(x ≥ y)
}
```

FIG. 5A

```
Merge(int m₁, m₂, m₃) {
    assert(m₁ ≥ 0 ∧ m₂ ≥ 0)
    k := i := 0;
    while (i < m₁) {
        assert(0 ≤ k < m₃)
        A[k++] = B[i++];
    }
    i := 0;
    while (i < m₂) {
        assert(0 ≤ k < m₃)
        A[k++] = C[i++];
    }
}
```

FIG. 5B

```
WPreFromPre(Input: Precondition I)
1  D_{i,j} := 0;
2  foreach 1 ≤ i,j ≤ n:
3    low := 0; high := MaxN;
4    while (high − low > 1/MaxD)
5      mid := (high + low)/2;
6      D_{i,j} := mid;
7      if ∃ a precondition I' s.t. I(D) ⇏ I'
8        then low := mid;
9        else high := mid;
10   D_{i,j} := low;
11 Output a precondition I' s.t. I(D) ⇏ I'.
```

FIG. 6

WPre(Input: Neighborhood structure N)
1  foreach cutpoint $\pi$ in reverse topological order:
2    $I := $ false;
3    while $\exists$ a relation $I'$ at $\pi$ s.t.
4      (a) $\bigwedge_{\pi' \in \text{Successors}(\pi)} \text{VC}(\pi, \pi')[I_\pi \leftarrow I']$
5      (b) $I \Rightarrow I'$ but $I' \not\Rightarrow I$
6      (c) $\bigwedge_{I'' \in N(I')} \left( \bigvee_{\pi' \in \text{Successors}(\pi)} \neg \text{VC}(\pi, \pi') \right) [I_\pi \leftarrow I'']$
7    do $\{I := I'\}$;
8    $I_\pi := I$;
9  Output $I_{\pi_{\text{entry}}}$;

FIG. 7

```
Swap(int x) {
    while (*)
        if (x = 1)
            x := 2;
        else if (x = 2)
            x := 1;
    assert(x ≤ 8);
}
```

```
SP2() {
    d := t := s := 0;
    while(1)
        if (*)
            t++; s := 0;
        else if (*)
            if (s < 5)
                d++; s++;
}
```

```
SPost(Input: Neighborhood structure N)
1  foreach cutpoint π in topological order:
2    I := true;
3    while exists a relation I' at π s.t.
4      (a) ⋀_{π'∈Predecessors(π)} VC(π',π)[I_π ← I']
5      (b) I' ⇒ I but I ⇏ I'
6      (c) ⋀_{I''∈N(I')} (⋁_{π'∈Predecessors(π)} ¬VC(π',π)) [I_π ← I'']
7    do { I := I'; }
8    I_π := I;
9  Output I_{π_exit};
```

*FIG. 9*

```
Loop(int n,m,x_0,y_0) {
    assert(x_0 < y_0);
    x := x_0; y := y_0;
    while (x < y)
        x := x + n;
        y := y + m;
}
```

Original Program

FIG. 10A

```
Loop(int n,m,x_0,y_0) {
    assert(x_0 < y_0);
    x := x_0; y := y_0; i := 0;
    while (x < y)
        i++;
        assert(i ≤ f(n,m,x_0,y_0));
        x := x + n;
        y := y + m;
}
```

Instrumented Program

FIG. 10B

```
Bug1(int y, n) {
1    x := 0;
2    if (y < 9)
3        while (x < n)
4            assert(x < 200);
5            x := x + y;
6    else
7        while (x ≥ 0)
8            x++;
}
```

Original Program

FIG. 11A

```
Bug1(int y, n) {
1    x := err := i₁ := i₂ := 0;
2    if (y < 9)
3        while (x < n)
4            i₁++;
5            assert(i₁ ≤ f₁(n, y));
6            if (x ≥ 200)
7                err := 1; goto L;
8            x := x + y;
9    else
10       while (x ≥ 0)
11           i₂++;
12           assert(i₂ ≤ f₂(n, y));
13           x++;
14 L: assert(err = 1);
}
```

Instrumented Program

FIG. 11B

```
NT1(int x, y) {
    while (x ≥ 0)
        x := x + y;
        y++;
}
```

*FIG. 12A*

```
NT2(int i) {
    even := 0;
    while (i ≥ 0)
        if (even = 0)
            i--;
        else
            i++;
        even := 1 - even;
}
```

*FIG. 12B*

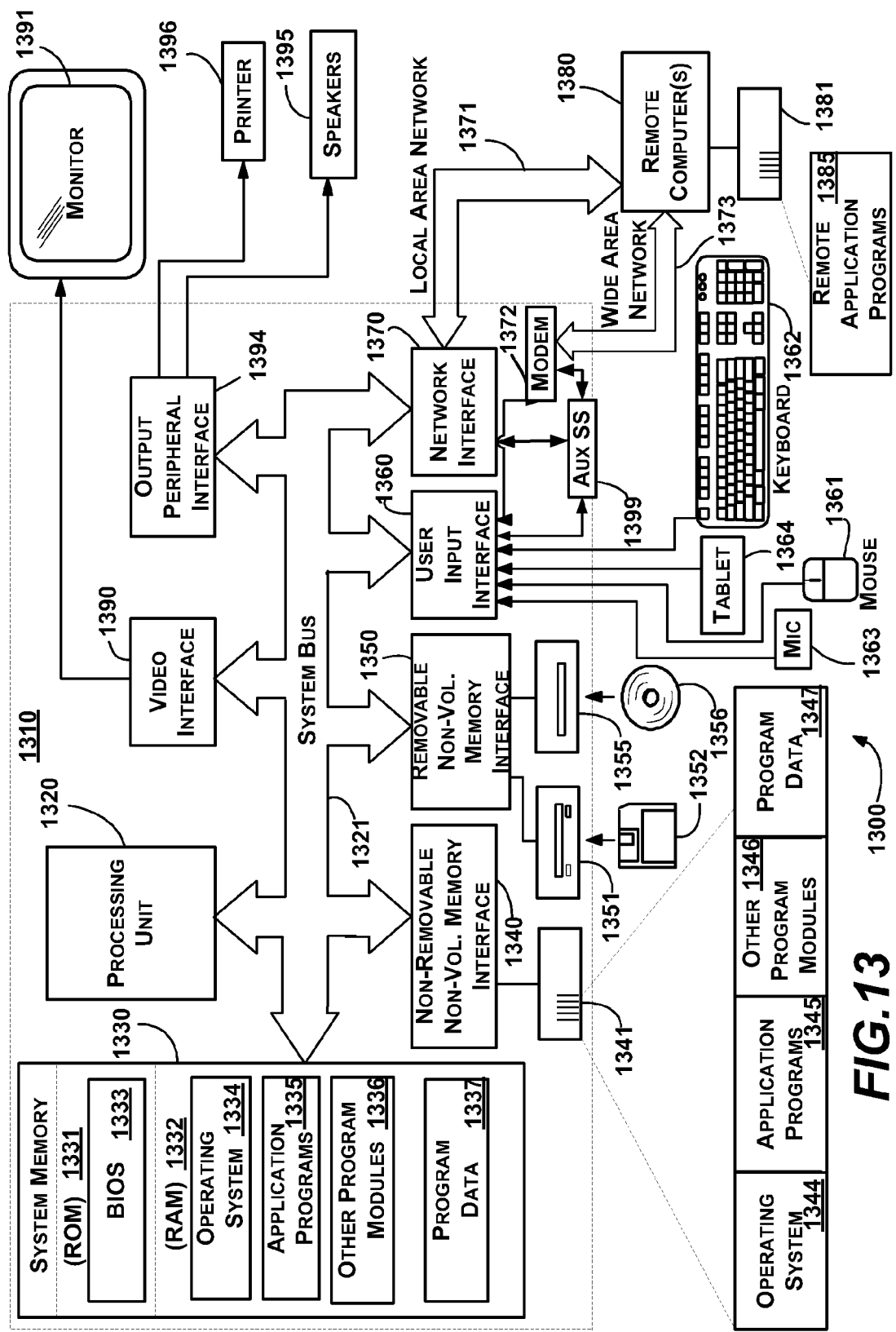

PROGRAM ANALYSIS AS CONSTRAINT SOLVING

BACKGROUND

A general goal of computer program verification is to discover invariants that are strong enough to verify given assertions in a program in order to prove program correctness and/or find bugs. Traditionally, iterative fixed-point computation based techniques like data-flow analyses, abstract interpretation or model checking have been used for discovering these invariants.

An alternative is to use a constraint-based invariant generation technique. Constraint-based techniques offer advantages over fixed-point computation based techniques, including that they are goal-directed and thus have the potential to be more efficient. Another advantage is that they do not require the use of widening heuristics that are used by fixed-point based techniques which lead to loss of precision that is often hard to control. However, current constraint-based techniques are limited in a number of ways.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which program analysis uses rich invariant templates that may specify an arbitrary Boolean combination of linear inequalities for program verification to determine constraints. Also described is choosing a cut-set that identifies program locations, each of which is associated with an invariant template.

The verification analysis generates second-order constraints, converts second-order logic formula based on those constraints into first-order logic formula, then converts the first-order logic formula into a quantifier-free formula, which is then converted into a Boolean satisfiability formula. Off-the-shelf constraint solvers may then be applied to the Boolean satisfiability formula to generate program analysis results. Various templates may be used to convert the second-order logic formula into the first-order logic formula.

The verification may perform interprocedural analysis, including by computing procedure summaries for relations between procedure inputs and outputs structured as sets of precondition and postcondition pairs. A weakest precondition may be generated using a binary search-based algorithm and/or using an algorithm that generates locally-weakest preconditions with respect to a given neighborhood structure. Analysis may determine a worst-case bound on the running time of a procedure, including by computing bounds on loop iterations or on a number of recursive procedure call invocations, or by computing bounds on both loop iterations and on a number of recursive procedure call invocations. Further, most-general counter-examples to termination may be determined, along with most-general counter-examples to safety assertions.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 2C is a representation of constraint data generated from processing the program of FIG. 2A over an unknown loop invariant at a loop header.

FIG. 3 is a representation of example program code for verification that requires a disjunctive invariant at a loop header.

FIGS. 4A and 4B are representations of example program code comprising interprocedural analysis examples.

FIGS. 5A and 5B are representations of program code illustrating weakest precondition examples.

FIG. 6 is a representation of program code illustrating a binary-search based iterative algorithm for computing a weakest precondition starting from any non-false precondition.

FIG. 7 is a representation of program code illustrating an alternative iterative algorithm for computing a weakest precondition based on an input neighborhood structure.

FIG. 8A is a representation of program code illustrating a weakest precondition example that has two locally pointwise-weakest relations at program entry.

FIG. 8B is a representation of program code illustrating a strongest postcondition example.

FIG. 9 is a representation of program code illustrating an iterative algorithm for computing a strongest postcondition based on an input neighborhood structure.

FIGS. 10A and 10B are representations of program code illustrating before and after instrumentation for discovering weakest preconditions for termination.

FIGS. 11A and 11B are representations of program code illustrating violation of a safety assertion (FIG. 11A), which is discovered by instrumenting the program (FIG. 11B) and running a weakest precondition algorithm.

FIGS. 12A and 12B are representations of program code illustrating non-termination examples.

FIG. 13 shows an illustrative example of a computing environment into which various aspects of the present invention may be incorporated.

DETAILED DESCRIPTION

Various aspects of the technology described herein are generally directed towards an program analysis approach that translates (the second-order constraints represented by) a program into (boolean) satisfiability constraints that can be solved using off-the-shelf boolean SAT solvers. In one aspect, there is described the choice of a cut-set that affects the precision and efficiency of the constraint processing algorithm. Further described are interprocedural analysis and the determination of weakest precondition and strongest postcondition examples.

It should be understood that the examples described herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and program analysis in general.

Figure 1:
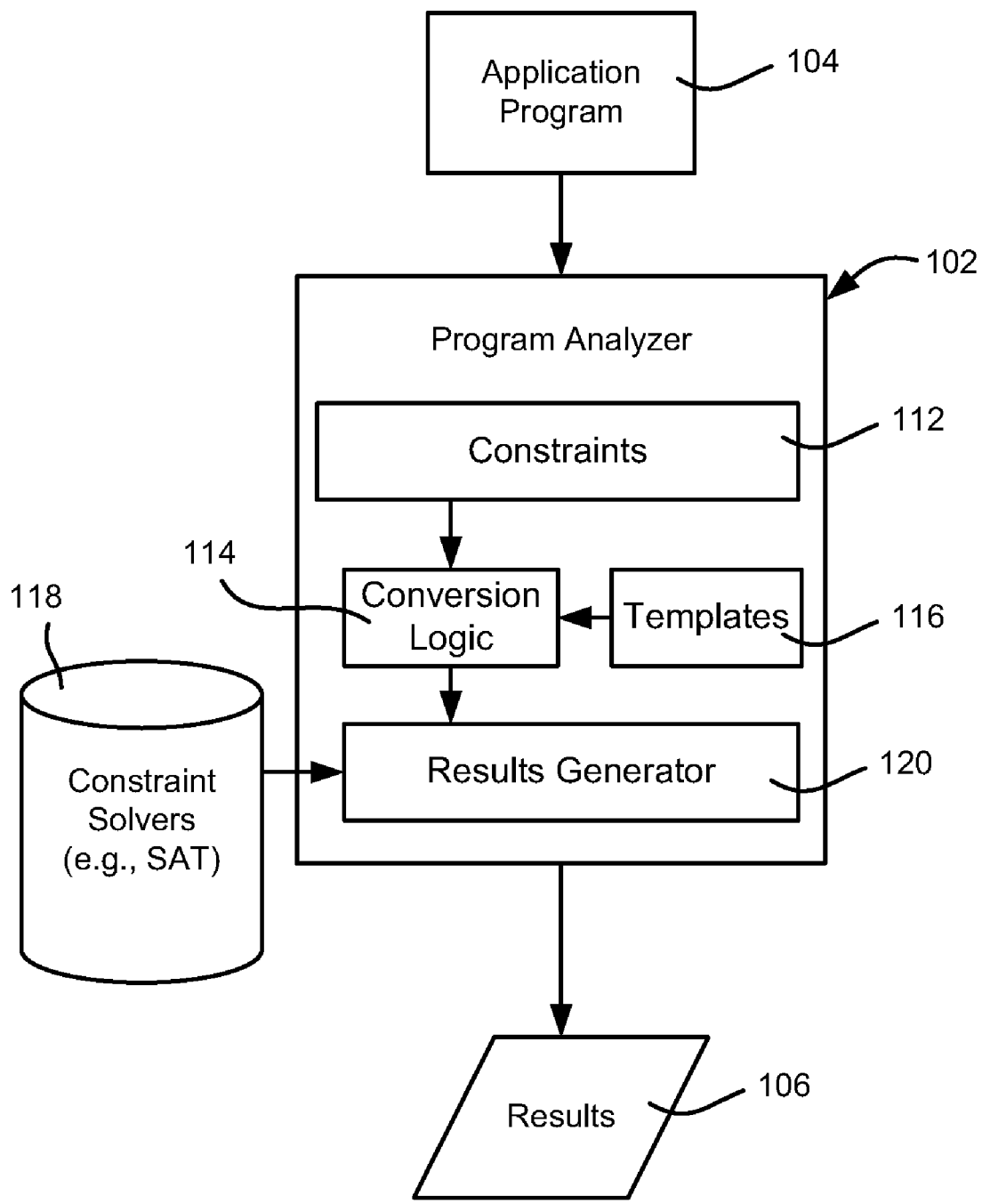
FIG. 1 is a block diagram representing example components in a program verification environment.

Turning to FIG. 1, there is shown a block diagram of a program analysis/verification environment. In general, a program analyzer 102 as described herein processes an application program 104 to provide verification results 106, e.g., assertions where appropriate, and/or identification of problems when found.

As described herein, the exemplified program analyzer 102 operates by generating second-order constraints 112. Conversion logic 114 uses various templates 116 as described herein to convert second-order logic formula based on those constraints into first-order logic formula followed by using Farkas lemma to convert that first-order logic formula into a quantifier-free formula followed by using bit-vector modeling to generate a SAT formula. Existing constraint solvers 118 (e.g., SAT solvers) may then be used (e.g., as selected by a results generator 120) to generate the results 106.

In one implementation, uniform constraint-based techniques are provided as a core framework, including for three classical program analysis problems, namely program verification, weakest precondition generation and strongest postcondition generation over the abstraction of linear arithmetic. Using this core framework of analyses other examples apply to bounds analysis and finding most-general counterexamples to safety and termination properties. One feature of the analyzer 102 is that it can uniformly handle a large variety of challenging examples that otherwise require many different specialized techniques for analysis.

Moreover, the constraint-based technique can generate linear arithmetic invariants with bounded Boolean structure, which also allows the approach to extend to a context-sensitive interprocedural setting. In one aspect, the scheme for reducing second-order constraints to SAT constraints may be used in solving a special class of second-order formulas.

Another aspect is directed towards an appropriate choice of cut-set. The analyzer 102 can verify assertions (safety properties) in benchmark programs (e.g., used by alternative state-of-the-art techniques) that require disjunctive invariants and sophisticated procedure summaries. Constraint-based invariant generation can be applied to verifying termination properties as well as to the difficult problem of bounds analysis.

A goal of weakest precondition generation is to infer the weakest precondition that ensures validity of all assertions in a given program. Described is a constraint-based technique for discovering some form of weakest preconditions. The analyzer 102 can generate weakest preconditions of safety as well as termination properties for a wide variety of programs that cannot be analyzed uniformly by any other technique.

Also described is an interesting application of weakest precondition generation, namely generating most-general counterexamples for both safety and termination properties. By generating most-general counterexamples (as opposed to generating any counterexample), counterexamples are characterized in a succinct specification that provides better intuition to the programmer. For example, if a program has a bug when $(n \geq 200+y) \land (9>y>0)$, then this information is more useful than simply generating any particular counterexample, say $n=356 \land y=7$ (as described below with reference to FIG. 11). The analyzer 102 may also generate weakest counterexamples for termination of some programs.

A goal of strongest postcondition generation is to infer precise invariants in a given program so as to precisely characterize the set of reachable states of the program. Note that current constraint-based invariant generation techniques work well only when the program enforces the constraint that the invariant be strong enough to verify the assertions. However, in absence of assertions in programs, there is no guarantee about the precision of invariants. Described is a constraint-based technique that can be used to discover some form of strongest invariants.

In the area of fixed-point computation based techniques, the problem of generating precise invariants has led to development of several widening heuristics that are tailored to specific classes of programs. The analyzer 102 can uniformly discover precise invariants for such programs.

Given a program with some assertions, the program verification problem is to verify whether or not the assertions are valid. One challenge in program verification is to discover the appropriate invariants at different program points, especially inductive loop invariants that can be used to prove the validity of the given assertions. Note that the issue of discovering counterexamples, in case the assertions are not valid, is described below.

In one implementation, programs are considered that have linear assignments, i.e., assignments of the form x:=e, or nondeterministic assignments x:=?. Assume and assert statements of the form assume(p) and assert(p) are also allowed, where p is some Boolean combination of linear inequalities $e \geq 0$. Here x denotes some program variable that takes integral values, and e denotes some linear arithmetic expression. Since assume statements are allowed, conditionals in the program are assumed to be non-deterministic.

Figures 2A, 2B:
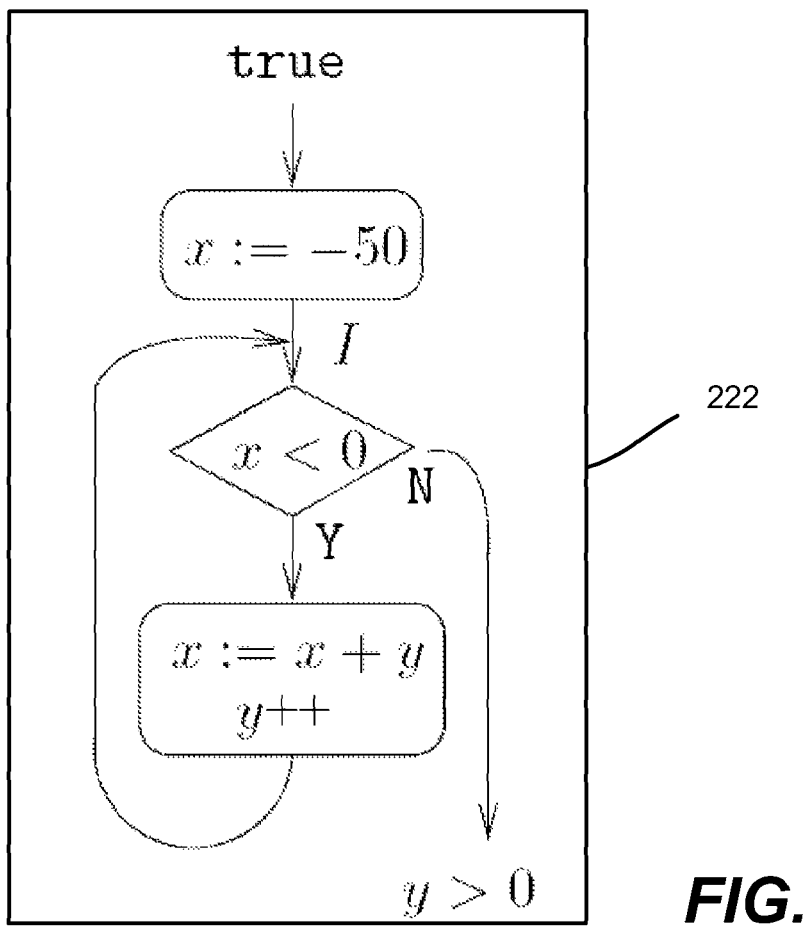
FIG. 2A is a representation of example program code for verification.
FIG. 2B is a representation of a control flow graph corresponding to the example program code of FIG. 2A.

One problem in program verification can be reduced to finding solutions to a second-order constraint. The second-order unknowns in this constraint are the unknown program invariants that are inductive and strong enough to prove the desired assertions. To illustrate the process of constraint generation for an example program, consider the program 220 in FIG. 2A with its corresponding control flow graph 222 in FIG. 2B. The program's precondition is true and postcondition is y>0. To prove the postcondition, the analyzer 102 needs to find a loop invariant I at the loop header. There are three paths in the program 220 that constrain I. The first corresponds to the entry case, that is, the path from true to I. The second corresponds to the inductive case, that is, the path that starts and ends at I and goes around the loop. The third corresponds to the exit case, that is, the path from I to y>0. FIG. 2C shows the corresponding formal constraints 224.

To generate such constraints in a more general setting of any arbitrary procedure, a first step is to choose a cut-set. A cut-set is a set of one or more program locations (called cut-points) such that each cycle in the control flow graph passes through some program location in the cut-set. These may be placed anywhere, not necessarily just at loop headers, and thus are considered herein to be arbitrarily located. One simple way to choose a cut-set is to include all targets of back-edges in any depth first traversal of the control-flow graph. (In case of structured programs, where all loops are natural loops, this corresponds to choosing the header node of each loop.) However, as described below, some other cut-set choices may be more desirable from an efficiency/precision viewpoint. For notational convenience, assume that the cut-set always includes the program entry location $\pi_{entry}$ and exit location $\pi_{exit}$.

Each cut-point $\pi$ is then associated with a relation $I_\pi$ over program variables that are live at $\pi$. The relations $I_{\pi entry}$ and $I_{\pi exit}$ at program's entry and exit locations, respectively, are set to true, while the relations at other cut-points are unknown relations that the analyzer seeks to discover. Two cut-points are adjacent if there is a path in the control flow graph from one to the other that does not pass through any other cut-point. Constraints between the relations at adjacent cut-points $\pi_1$ and $\pi_2$ are as follows: let Paths$(\pi_1, \pi_2)$ denote the set of paths between $\pi_1$ and $\pi_2$ that do not pass through any other cut-point. The notation VC$(\pi_1, \pi_2)$ is used to denote the constraint that the relations $I\pi_1$ and $I\pi_2$ at adjacent cut-points $\pi_1$ and $\pi_2$, respectively, are consistent with respect to each other:

$$VC(\pi_1, \pi_2) = \forall X \left( \bigwedge_{v \in \text{Paths}(\pi_1, \pi_2)} (I_{\pi_1} \Rightarrow \omega(\tau, I_{\pi_2})) \right) \quad 5$$

Above, X denotes the set of program and fresh variables that occur in $I_{\pi_1}$ and $\omega(\tau, I_{\pi_2})$. The notation $\omega(\tau, I)$ denotes the weakest precondition of path $\pi$ (which is a sequence of program instructions) with respect to I and is as defined below:

$$\omega(\text{skip}, I) = I \qquad \omega(\text{assume } p, I) = p \Rightarrow I$$
$$\omega(x := e, I) = I[e/x] \qquad \omega(\text{assert } p, I) = p \wedge I$$
$$\omega(x := ?, I) = I[r/x] \quad \omega(S_1; S_2, I) = \omega(S_1, \omega(S_2, I))$$

where r is some fresh variable and the notation [e/x] denotes substitution of x by e and may not be eagerly carried out across unknown relations. Let $\pi_1$, $\pi_2$ range over pairs of adjacent cut-points. Then any solution to the unknown relations $I_\pi$ in the following (verification) constraint (which also may have substitutions), yields a valid proof of correctness:

$$\bigwedge_{\pi_1, \pi_2} VC(\pi_1, \pi_2) \quad (1)$$

Note that this constraint is universally quantified over the program variables and is a function of $\vec{I}$, the vector of relations $I_\pi$ at all cut-points (including $I_{\pi_{entry}}, I_{\pi_{exit}}$). It is written as the verification constraint $\forall X.\phi(\vec{I})$.

For program verification $I_{\pi_{entry}}$ and $I_{\pi_{exit}}$ are set to true. Returning to the above example, the second order constraints corresponding to the program in FIG. 1A are shown in FIG. 1C and correspond to the entry, inductive and exit constraints for the loop.

Turning to constraint solving, and to solving the second-order constraint from Equation 1 that represents the verification condition of unknown relations at cut-points, one way to solve these constraints for discovering the unknown invariants $I_\pi$ is to use fixed-point based techniques like abstract interpretation. Another (significantly manual) approach is to require the programmer to provide the invariants at the cut-points, which can then be verified using a theorem prover. Instead, the approach described herein is directed towards reducing the second-order constraint into a Boolean formula such that a satisfying assignment to the formula maps to a satisfying assignment for the second-order constraint. The reduction over the constraints may be illustrated via FIG. 2C.

This constraint-solving approach involves three main steps. First, some invariant templates 116 (possibly disjunctive) are assumed to reduce the second-order constraints to first-order constraints over the unknown parameters of the templates 116. Farkas' lemma is then used to translate the first-order constraints (with universal quantification) into an existentially quantified multi-linear quadratic constraint. These constraints are then translated into a SAT formula using bit-vector modeling (instead of solving them using specialized mathematical solvers, for example).

To convert second-order unknowns to first-order unknowns, instead of searching for a solution to unknown relations (which are second-order entities) from an arbitrary domain, the search is restricted to a template that is some Boolean combination of linear inequalities among program variables. For example, an unknown relation can have the template:

$$\left( \sum_i a_i x_i \geq 0 \wedge \sum_i b_i x_i \geq 0 \right) \vee \left( \sum_i c_i x_i \geq 0 \wedge \sum_i d_i x_i \geq 0 \right),$$

where $a_i$, $b_i$, $c_i$, $d_i$ are all unknown integer constants and $x_i$ are the program variables. The template can be provided by the user (for example, by specifying the maximum number of conjuncts and disjuncts in DNF representation of any unknown relation), or an iterative scheme may be used that progressively increases the size of the template until a solution is found. Given such templates, the unknown relations in the constraint in Equation 1 are replaced by the templates, thereafter applying any pending substitutions to obtain a first-order logic formula with unknowns that range over integers.

For the example in FIG. 2A, a relevant invariant template is $(a_1 x + a_2 y + a_3 \geq 0) \vee (a_4 x + a_5 y + a_6 \geq 0)$, where the $a_i$'s are (integer) unknowns to be discovered. If the chosen domain for the template is not expressive enough, then the constraints will be unsatisfiable. Conversely, if there is redundancy, then redundant templates can always be instantiated with true or false as required. This step of the reduction translates the verification constraint in FIG. 2C with second-order unknowns I to first-order unknowns $a_i$'s. For example, the first constraint in FIG. 1C after this step is true $\Rightarrow (-50_{a1} + a_2 y + a_3 \geq 0) \vee (-50 a_4 + a_5 y + a_6 \geq 0)$.

Next, first-order universal quantification is translated to first-order existential quantification using Farkas' lemma (at the cost of doing away with some integral reasoning). Farkas' lemma implies that a conjunction of linear inequalities $e_i \geq 0$ (with integral coefficients) is unsatisfiable over rationals iff (meaning if and only if as used herein) some nonnegative (integral) linear combination of $e_i$ yields a negative quantity, i.e.:

$$\forall X \left( \neg \left( \bigwedge_i e_i \geq 0 \right) \right) \Leftrightarrow \exists \lambda > 0, \lambda_i \geq 0 \left[ \forall X \left( \sum_i \lambda_i e_i \equiv -\lambda \right) \right]$$

The reverse direction of the above lemma is straightforward, since it is not possible for a non-negative linear combination of non-negative expressions $e_i$ to yield a negative quantity. The forward direction also holds since the only way to reason about linear inequalities over rationals is to add them, multiply them by a non-negative quantity or add a non-negative quantity. The universal quantification on the right hand side of the above equivalence is over a polynomial equality, and hence can be removed equating the coefficients of the program variables X on both sides of the polynomial equality. Any universally quantified linear arithmetic formula $\forall X(\phi)$ may be converted into an existentially quantified formula using Farkas' lemma as follows: convert $\phi$ in conjunctive normal form $$\bigwedge_i \phi_i,$$

where each conjunct $\phi_i$ is a disjunctions of inequalities $$\bigvee_j e_i^j \geq 0.$$

Note that $$\forall X(\phi) = \bigwedge_i \forall X(\phi_i)$$

and that $\phi_i$ can be rewritten as $$\neg \bigwedge_j (-e_i^j - 1 \geq 0)$$

whereby Farkas' lemma, as stated above, can be applied to each $\forall X(\phi_i)$.

FIG. 1C illustrates the application of this step over the first constraint obtained from the previous step. After Step 1 there is: true $\Rightarrow e_1 \geq 0 \vee e_2 \geq 0$ (where $e_1 \equiv -50a_1 + a_2y + a_3 \geq 0$ and $e_2 \equiv -50a_4 + a_5y + a_6 \geq 0$ as obtained earlier). After expanding the implication, there is a constraint (that is already in conjunctive normal form) and therefore the corresponding unsatisfiability constraint is $\neg((-e_1 - 1 \geq 0) \wedge (-e_2 - 1 \geq 0))$. Farkas' lemma can now be applied to yield $\exists \lambda_1, \lambda_2 \geq 0, \lambda > 0 (\forall_{x,y}, \lambda_1(-e_1 - 1) + \lambda_2(-e_2 - 1) \equiv -\lambda)$. Collecting the coefficients for x, y gives a first-order existential constraint. Notice that $\lambda_1$ (respectively $\lambda_2$) is multiplied with the coefficients inside $e_1$ (respectively $e_2$) and therefore this is a multi-linear quadratic constraint over integer variables. Equating the coefficients of y and the constant term gives the constraints: $(50a_1\lambda_1 - a_3\lambda_1 - \lambda_1) + (50a_4\lambda_2 - a_6\lambda_2 - \lambda_2) = -\lambda$ and $a_2\lambda_1 + a_5\lambda_2 = 0$.

A next step converts the first-order existentially quantified (or quantifier-free) formula obtained from the previous step into a SAT formula. The formula obtained from that previous step is a conjunction of (multilinear quadratic polynomials) over integer variables. Such a formula may be converted into a SAT formula by modeling integer variables as bit-vectors and encoding integer operations like arithmetic, multiplication, and comparison as Boolean operations over bit-vectors. This approach to constraint solving provides that any satisfying solution to the SAT formula yields a valid proof of correctness. Note that this constraint solving approach is complete if the unknown invariants are instances of given templates, and if checking consistency of invariants at adjacent cut-points does not require integral reasoning.

Turning to the choice of a cut-set, the choice of a cut-set affects the precision and efficiency of any constraint-based technique. Described herein is the choosing of a cut-set that strikes a good balance between precision and efficiency. Based on the definition of a cut-set, it follows that some program locations from each loop need to be included in the cut-set. One strategy is to include all header nodes (or targets of back-edges) as cut-points; such a choice of cut-set necessitates searching/solving for unknown relations over disjunctive relations when the proof of correctness involves a disjunctive loop invariant. Note that for several programs that require disjunctive loop invariants, there is another choice for cut-set that requires searching for unknown relations over only conjunctive domains. Furthermore, the number of conjuncts required is less compared to those required when the header nodes are chosen to be cut-points. This choice for cut-set corresponds to choosing one cut-point on each path inside the loop. If there are multiple sequential conditionals present inside a loop, this requires expanding the control-flow inside the loop into disjoint paths and choosing a cut-point anywhere on each disjoint path. Indeed, this choice for cut-set leads to the greatest precision in the following sense:

THEOREM 1. Let C be a cut-set that includes a program location on each acyclic path inside a loop (after expansion of control flow inside the loop into disjoint paths). Suppose that the search space for unknown relations is restricted to templates that have a specified Boolean structure. If there exists a solution for unknown relations corresponding to any cut-set, then there also exists a solution for unknown relations corresponding to cut-set C.

Various examples show that the reverse direction in Theorem 1 is not true (i.e., there exists a solution to the unknown relations corresponding to cut-set C, but there is no solution to unknown relations corresponding to some other choice of cut-set). This is illustrated by the example in FIG. 3. Let $\pi_i$ denote the program point that immediately precedes the statement at line i in the program. The simplest choice of cut-set corresponds to choosing the loop header (program location $\pi_2$). The inductive invariant that is required at the loop header, and is discovered by the analyzer 102, is the disjunction $(0 \leq x \leq 51 \wedge x=y) \vee (x \geq 51 \wedge y \geq 0 \wedge x+y=102)$. If instead the cut-set is chosen to be $\{\pi_4, \pi_6\}$ (based on the strategy described in Theorem 1), then the inductive invariant map is conjunctive. This is significant because conjunctive invariants are easier to discover. The analyzer 102 discovers the inductive invariant map $\{\pi_4 \rightarrow (y \geq 0 \wedge x \leq 50 \wedge x=y), \pi_6 \rightarrow (y \geq 0 \wedge x \geq 50 \wedge x+y=102)\}$ in such a case. However, the choice of cut-set mentioned in Theorem 1 does not always remove the need for disjunctive invariants. The example in FIG. 2A has no conditionals inside the loop, and yet any (linear) inductive invariant required to prove the assertion is disjunctive (e.g., $(x<0) \vee (y>0)$, which is what the analyzer 102 discovers). Heuristic proposals for handling disjunction fail to discover invariants for such programs.

Turning to interprocedural analysis, the computation described above is applicable only in an intraprocedural setting. The constraint-based method may be extended to perform a precise (i.e., context sensitive) interprocedural analysis. Precise interprocedural analysis is challenging because the behavior of the procedures needs to be analyzed in a potentially unbounded number of calling contexts. One way to do precise interprocedural analysis is to compute procedure summaries, which are relations between procedure inputs and outputs. These summaries are usually structured as sets of pre/postcondition pairs $(A_i, B_i)$, where $A_i$ is some relation over procedure inputs and $B_i$ is some relation over procedure inputs and outputs. The pre/postcondition pair $(A_i, B_i)$ denotes that whenever the procedure is invoked in a calling context that satisfies constraint $A_i$, the procedure ensures that the outputs will satisfy the constraint $B_i$.

As described herein, a constraint-based approach is particularly suited to discovering such useful pre/postcondition $(A_i, B_i)$ pairs. To this end, note that the desired behavior of most procedures can be captured by a small number of such (unknown) pre/postcondition pairs. Procedure calls may be replaced by these unknown behaviors and assert that the procedure, in fact, has such behaviors. More particularly, assume that a procedure does not read/modify any global variables; instead all global variables that are read by the procedure are passed in as inputs, and all global variables that are modified by the procedure are returned as outputs. Suppose there are q interesting pre/postcondition pairs for procedure P(x){S; return y;} with the vector of formal arguments x and vector of return values y. In practice, the value of q can be iteratively increased until invariants are found that make the constraint system satisfiable. The behavior of procedure P may be summarized using q tuples $(A_i, B_i)$ for $1 \leq i \leq q$, where $A_i$ is some relation over procedure inputs x, while $B_i$ is some relation over procedure inputs and outputs x and y.

This is indeed the case by generating constraints for each i as below and asserting their conjunction:

$$\text{assume}(A_i); S; \text{assert}(B_i); \quad (2)$$

Procedure calls v:=P(u) on any simple path are compiled away by replacing them with the following code fragment:

$$v := ?; \text{assume}\left(\bigwedge_i (A_i[u/x] \Rightarrow B_i[u/x, v/y])\right); \quad (3)$$

Note that in one approach, there is no need, in theory, to have q different pre/postcondition pairs. In fact, the summary of a procedure can also be represented as some formula $\phi(x, y)$ (with arbitrary Boolean structure) that represents a relation between procedure inputs x and outputs y. In such a case, it is asserted that $\phi$ indeed is the summary of procedure P by generating a constraint for $\{S; \text{assert}(\phi(x, y));\}$, and a procedure call v:=P(u) is compiled away by replacing it by the code fragment v:=?; assume($\phi[u/x, v/y]$). However, this approach of maintaining multiple symbolic pre/postcondition pairs (which is also inspired by the data structures used by the traditional fixed-point computation algorithms) is more efficient because it enforces more structure on the assume-guarantee proof and leads to lesser unknown quantities and simpler constraints.

Consider the example 440 shown in FIG. 4A. The analyzer 102 verifies the assertion by generating the pre/post pair ($i \geq 0$, ret=i+j) for procedure Add. This example illustrates that only relevant pairs are computed for each procedure. In addition to serving as the base case of the recursion, the true branch of the condition inside Add has the concrete effect formalized by the pre/post pair (i<0, ret=j). However, this behavior is not needed to prove any assertion in the program and is therefore suppressed. The procedure M(int n) 442 in FIG. 4B is the widely known McCarthy 91 function whose most accurate description is given by the pre/post pairs (n>100, ret=n−10) and (n≤100, ret=91). The function has often been used as a benchmark test for automated program verification. The goal-directed nature of the verification problem allows the analyzer 102 to derive (101≤n≤119, ret=n−10) and (n≤100, ret=91) as the pairs that prove the program assertion. As such, it discovers only as much as is required for the proof.

Given a program with some assertions, the problem of weakest precondition generation is to infer the weakest precondition $I_{\pi entry}$ that ensures that whenever the program is run in a state that satisfies $I_{\pi entry}$, the assertions in the program hold. As described below, a solution to this problem can be a useful tool for a wide range of applications. There is thus described herein a constraint-based approach to inferring weakest preconditions under a given template. Because a precise solution to this problem is undecidable, a relaxed notion of weakest precondition is used, namely for a given template structure, A is considered a weakest precondition if A is a precondition that fits the template and involves constants whose absolute value is at most c (where c is some given constant such that the solutions of interest are those that involve constants whose absolute value is at most c) and there does not exist a weaker precondition than A with similar properties.

A first step in a constraint-based approach to weakest precondition generation is to treat the precondition $I_{\pi entry}$ as an unknown relation in Equation 1, unlike in program verification where $I_{\pi entry}$ is set to be true. However, this small change merely encodes that any consistent assignment to $I_{\pi entry}$ is a valid precondition, not necessarily the weakest one. In fact, when running the analyzer 102 with this small change for any example, it returns false as a solution for $I_{\pi entry}$. Note that false is always a valid precondition, but not necessarily the weakest one. One simple approach to finding the weakest precondition may be to search for a precondition that is weaker than the current solution (which can be easily enforced by adding another constraint to Equation 1), and to iterate until none exists. However, this approach can have a very slow progress. When analyzing the example in FIG. 5A using this approach, the analyzer 102 iteratively produced i≥j+127, i≥j+126, ..., i≥j under a modeling that used 8-bit two's-complement integers. In general this naïve iterative technique will be infeasible. Thus the constraint system needs to include the notion of a weakest relation.

To encode that $I_{\pi entry}$ is a weakest precondition, the verification constraint in Equation 1 can be regarded as function of two arguments $I_{\pi entry}$ and $I_r$, where $I_r$ denotes the relations at all cut-points except at the program entry location, and can thus be written as $\forall X. \phi(I_{\pi entry}, I_r)$. For any other relation I' that is strictly weaker than $I_{\pi entry}$, it should not be the case that I' is a valid precondition. This can be stated as the following constraint.

$$\forall X.\phi(I_{\pi entry}, I_r) \land \forall I', I'_r(\text{weaker}(I', I_{\pi entry}) \Rightarrow \neg \forall X. \phi(I', I'_r))$$

where weaker $$(I', I_{\pi entry}) \stackrel{def}{=} (\forall X \cdot (I_{\pi entry} \Rightarrow I') \land \exists X \cdot (I' \land \neg I_{\pi entry})).$$

Farkas' lemma cannot be applied here because there is existential quantification nested inside universal quantification.

By way of example, for the procedure 440 in FIG. 4A, the analyzer 102 generates two different conjunctive preconditions (which individually ensure the validity of the given assertion): (i) (i≥j), which ensures that when the loop terminates then x≤y, (ii) (i≥0), which ensures that the loop never terminates making the assertion unreachable and therefore trivially true. FIG. 4B shows an array merge procedure 442 that is called to merge two arrays B,C of sizes $m_1, m_2$ respectively into a third one A of size $m_3$. The procedure is correct if no invalid array access are made (stated as the assertions inside the loops) when it is run in an environment where the input arrays B and C are proper (i.e. $m_1, m_2 \geq 0$, which is specified as an assertion at the procedure entry). For the Merge procedure 442 in FIG. 4B, the analyzer 102 generates two different conjunctive preconditions $m_3 \geq m_1 + m_2 \land m_1 \geq 0 \land m_2 \geq 0$ and $m_1 = 0 \land m_2 = 0$.

Described is a binary search strategy, noting that the weakest precondition to be discovered is a conjunctive invariant. This is because the disjunctive weakest precondition can be obtained as disjunctions of disjoint weakest conjunctive solutions.

THEOREM 2:

$$\text{Let } I \equiv \bigwedge_{i=1}^{n} e_i \geq 0$$

be some non-false precondition. For any n×(n+1) matrix D of non-negative constants, let I(D) denote the formula $$\bigwedge_{i=1}^{n}\left(D_{i,n+1} + \sum_{j=1}^{n} D_{i,j} e_i \geq 0\right).$$

Let I' be some weakest precondition (in our template structure) s.t. I ⇒ I'. Then, A1. There exists a non-negative matrix D' such that I'=I(D').

A2. For any matrix D'' that is strictly larger than D' (i.e., D''$_{i,j}$≧D'$_{i,j}$ for all i, j and D''$_{i,j}$>D'i,j for some i, j), I(D'') is not a precondition (in this template structure).

A3. For any (non-negative) matrix D''' that is smaller than D' (i.e., D'''$_{i,j}$≧D'$_{i,j}$ for all i, j), I(D''') is a precondition.

Note that A1 follows from Farkas' lemma, A2 follows from the fact that I(D'') is strictly weaker than I(D') and I(D') is a weakest precondition, and A3 follows from the fact that I(D''') is stronger than I(D').

Theorem 2 suggests a binary search-based algorithm 660 (shown in FIG. 6) for finding a weakest precondition. The parameters MaxN and MaxD denote an upper bound on the values of the numerator and denominator of any rational entry of the matrix D' referred to in Theorem 2(A1). Since the absolute values of the coefficients in I and I' are bounded above by c, MaxD and MaxN are bounded above by $N^{N/2} \times c^N$, where N=$n^2$.

Note that the preconditions in line 7 and line 11 of FIG. 6 can be generated by adding the additional constraint I(D)⇒I$_{\pi entry}$ to the verification condition for the procedure, and then solving for the resulting constraint using the technique described above. Also note that the matrix D computed at the end is not exactly the matrix D' referred to in Theorem 2(A1) but is close enough in the sense that any precondition weaker than I(D) is a weakest one. The algorithm 660 in FIG. 6 involves making a maximum of $n^2 \times \log(\text{MaxN} \times \text{MaxD})$ queries to the constraint solver. Hence, it is useful to start with a non-false precondition with the least value of n (where n denotes the number of conjunctions of linear inequalities in the input precondition I). Such a precondition can be found by iteratively increasing the number of conjuncts in the template for the precondition until one is found.

Another algorithm for generating a weakest precondition may be even more efficient. More particularly, assume that each non-trivial maximally strongly connected component in the control flow graph has exactly one cut-point (an assumption that can also be ensured by simple transformations); note however that this will work without this assumption. An algorithm 770 for generating a weakest precondition is described in FIG. 7. Line 8 initializes I$_\pi$ to a pointwise-weakest relation (defined below) for each cut-point π in reverse topological order of the control dependences between different cut-points. (Note that since it is assumed that each maximal SCC does not have more than one cut-point, there are no cyclic control dependences between different cut-points.) A relation I at a cut-point is defined to be pointwise-weakest if it is a weakest relation that is consistent with respect to the relations at its neighboring (successor) cutpoints. The pointwise-weakest relation thus generated at the program entry location will be a weakest precondition. The while loop in Line 3 of the algorithm 770 generates a pointwise-weakest relation at a cut-point π by generating a locally pointwise-weakest relation (as defined below) with respect to the input neighborhood structure N in each iteration, and repeating the process to obtain a weaker locally pointwise-weakest relation until one exists. A relation I is a locally pointwise-weakest relation with respect to a neighborhood N if it is a weakest relation among its neighbors that is consistent with respect to the relation at its neighboring (successor) cut-points. A locally pointwise weakest relation can be generated by solving the constraints on Lines 4-6. Note that the constraints I' ≠ I and ¬VC(π, π') are already existentially quantified, and hence do not require the application of Farkas' lemma to remove universal quantification. The only difference is that there are now quadratic inequalities as opposed to quadratic equalities obtained at the end of the above-described second step of the constraint-solving methodology. However, the bit-vector modeling in the last step works for quadratic equalities as well as inequalities. Also note that the neighborhood structure N should be such that it should be possible to enumerate all elements of N(I') for any invariant template I'.

The performance of the algorithm depends on the choice of the input neighborhood structure, which affects the number of iterations of the loop in Line 3. A denser neighborhood structure may result in a lesser number of iterations of the while loop (i.e., a lesser number of queries to the constraint solver), but a larger-sized query as a result of the condition in Line 7.

The following neighborhood structure N may be quite efficient in practice. The set of relations that are in the neighborhood N of a conjunctive relation is described below:

$$N\left(\bigwedge_{i=1}^{n} e_i \geq 0\right) = \left\{e_j + 1 \geq 0 \wedge \bigwedge_{i \neq j} e_i \geq 0 \,\middle|\, 1 \leq j \leq n\right\} \cup$$

$$\left\{e_j + e_l \geq 0 \wedge \bigwedge_{i \neq j} e_i \geq 0 \,\middle|\, j \neq l \wedge 1 \leq j, l \leq n\right\}$$

The neighborhood structure set forth above has a geometric interpretation. The neighbors of a convex region $$\bigwedge_{i} e_i \geq 0$$

are obtained by slightly moving any of the hyper-planes $e_j \geq 0$ parallel to itself, or by slightly rotating any of the hyper-planes $e_j \geq 0$ along its intersection with any other hyper-plane $e_l \geq 0$. The neighborhood structure defined above may be extended to relations in disjunctive normal form as:

$$N\left(\bigvee_{i=1}^{m} I_i\right) = \left\{I'_j \vee \bigvee_{i \neq j} I_i \,\middle|\, 1 \leq j \leq m; I'_j \in N(I_j)\right\}$$

Note that the above choice of the neighborhood structure helps avoid the repeated iteration over the preconditions i≧j+127, i≧j+126, ..., i≧j to obtain the weakest precondition i≧j for the example in FIG. 5A. None of these preconditions except i≧j is locally pointwise-weakest with respect to the above neighborhood structure. Hence, the use of the above neighborhood structure requires only one iteration of the while loop in the algorithm in FIG. 7 for obtaining weakest precondition for the example in FIG. 5A.

However, in general, a locally pointwise-weakest relation with respect to the neighborhood structure defined above may not be a pointwise-weakest relation. For example, consider the program 880 in FIG. 8A. The relations x≦0 and x≦8 are both locally pointwise-weakest relations (with respect to the above neighborhood structure) at program entry. However, only the relation $x \leq 8$ is a pointwise weakest relation at program entry (and hence a weakest precondition). Thus, use of the above neighborhood structure requires two iterations of the while loop in the algorithm in FIG. 7 for obtaining weakest precondition for the example in FIG. 8A.

It should be noted that the use of a binary search algorithm for weakest precondition generation may be combined with the neighborhood-structure approach for weakest precondition generation. The binary search algorithm provides good theoretical results, while the neighborhood-structure approach provides good practical results.

The problem of strongest postcondition is to generate the most precise invariants at a given cut-point. As in the weakest precondition case, a relaxed notion of strongest postcondition is used. The technique for generating strongest postcondition is very similar to the weakest precondition inference technique described above, and uses the algorithm 990 described in FIG. 9, with the following neighborhood structure:

$$N\left(\bigwedge_{i=1}^{n} e_i \geq 0\right) = \left\{ e_j - 1 \geq 0 \land \bigwedge_{i \neq j} e_i \geq 0 \mid 1 \leq j \leq n \right\} \cup$$
$$\left\{ e_j - e_l \geq 0 \land \bigwedge_{i \neq j} e_i \geq 0 \mid j \neq l \land 1 \leq j, l \leq n \right\}$$

By way of examples of a more general version of the procedure in FIG. 3, replace the constant 50 by a symbolic constant m that is asserted to be non-negative. The analyzer 102 then generates the postcondition x=2m+2. For the procedure in FIG. 8B, the analyzer 102 generates the strongest postcondition $s+d+t \geq 0 \land d \leq s+5t$.

The above-described constraint-based techniques for verification of safety properties may be applied for finding counterexamples to safety properties, verification of termination (which is a liveness property), and finding counterexamples to termination. The termination problem involves checking whether the given procedure terminates under all inputs. The constraint-based approach may be used to solve a more difficult problem, namely bounds analysis. The problem of bounds analysis is to find a worst-case bound on the running time of a procedure (e.g., in terms of the number of instructions executed) expressed in terms of its inputs. One method builds on the techniques that reduce the bounds analysis problem to discovering invariants of a specific kind. In general, this is directed towards computing bounds on loop iterations and number of recursive procedure call invocations. Each of these can be bounded by appropriately instrumenting counter variables and estimating bounds on counter variables. In particular, the number of loop iterations of a while loop "while c do S" can be bounded by computing an upper bound on the instrumented variable i inside the loop in the following code fragment: "i:=0; while c do {i++; S;}". The number of recursive procedure call invocations of a procedure "P(x) {S}" can be bounded similarly by computing an upper bound on global variable i inside procedure P in the following code fragment: "P(x){i:=0; P'(x);}; P'(x'){i++; S[x'/x];}".

In general, let P be a given program and let P' be the transformed program obtained after instrumenting counters that keep track of loop iterations and recursive call invocations and introducing partial assertions at appropriate locations that assert that the counters are bounded above by some function of the inputs. The program P terminates iff the assert statements in P' are satisfied. While invariant generation tools such as abstract interpretation can be used to compute bounds on the counter variables, a constraint-based approach is particularly suited for discovering these invariants since they have a specified form and involve linear arithmetic. To this end, assert statements are used with templates $$i \leq a_0 + \sum_i a_i x_i$$

(at the counter increment i++ site in case of loops and at the end of the procedure in case of recursive procedures) for bounding the counter variable. Note that in addition to the counter instrumentation strategy mentioned above, other counter instrumentation strategies can be used to compute non-linear bounds as a composition of linear bounds on multiple instrumentation counters. Such techniques can also be used herein to compute non-linear bounds using linear templates. Additionally, the constraint-based approach solves an even more difficult problem, namely inferring preconditions under which the procedure terminates and inferring a bound under that precondition.

For this purpose, the analyzer tool is run in the weakest precondition inference mode. This is particularly significant when procedures are expected to be called under certain preconditions and would not otherwise terminate under all inputs. By way of example, in FIGS. 10A and 10B, the analyzer 102 computes the weakest precondition $n \geq m+1 \land x_0 \leq y_0 - 1$ and the bound $y_0 - x_0$. The latter requires discovering the inductive loop invariant $i \leq (x - x_0) - (y - y_0)$.

Because program analysis is an undecidable problem, there are no tools that can prove correctness of all correct programs or find bugs in all incorrect programs. To maximize the practical success rate of verification tools, it is desirable to search for both proofs of correctness as well as counterexamples in parallel. To find most-general counterexamples to safety properties, the problem of generating a most-general counterexample for a given set of (safety) assertions involves finding the most general characterization of inputs that leads to the violation of some reachable safety assertion.

To find such a characterization using the techniques described above, a general aspect is directed towards reducing the problem to that of finding the weakest precondition for an assertion. This reduction involves constructing another program from the given program P using the following transformations:

B1 Instrumentation of program with an error variable: A new error variable is introduced that is set to 0 at the beginning of the program. Whenever violation of any assertion occurs (i.e., the negation of that assertion holds), the error variable is set to 1 and jump to the end of the program, where it is asserted that the error variable is equal to 1. The original assertions are removed from the program.

B2 Instrumentation to ensure termination of all loops: For this the program is instrumented with counter variables and assertion templates that assert that the counter variable is upper bounded by some function of loop inputs or procedure inputs.

In general, let P be a program with some safety assertions. Let P' be the program obtained from program P by using the transformation described above. Then, P has an assertion violation iff the assertions in program P' hold; this does hold, meaning that the weakest precondition inference on the transformed program may be used to discover the most-general characterization of inputs under which there is a safety violation in the original program.

By way of example, the program 1102 shown in FIG. 11A is instrumented using transformations B1 and B2, with the resulting program 1104 is shown in FIG. 11B. The analyzer 102 discovers the precondition $(n \geq 200+y) \land (9>y>0)$. The loop invariant (at line 3) that establishes the assertion in the instrumented program is $(n \geq 200+y) \land (i \leq x) \land (9>y>0) \land (x<n)$. Note that this invariant implies the instantiation n for the loop bound function $f_1(n, y)$. On the other hand the precondition y<9 implies that the loop on line 10 is unreachable, and hence any arbitrary $f_2$ suffices. Note that the transformation B1 does not insist that in each iteration of the loop the original assertion does not hold. Note further that transformation B2 ensures that the tool does not comes up with $y \leq 0$ as the weakest precondition whereby the assertion at the end of the program always holds since that location is unreachable. Note however that the transformation B2 does not ensure termination of all loops in the original program. The transformation B2 ensures termination of only those loops that are reachable under the to-be-discovered weakest precondition and that in the program obtained after transformation B1, which introduces extra control flow that causes loops to terminate as soon as the violation of any safety property occurs. For example, the loop on line 10 in FIG. 11B is unreachable under the discovered preconditions and therefore any arbitrary function $f_2$ suffices.

The problem of generating a most-general counterexample for program termination involves finding the most-general characterization of inputs that leads to non-termination of the program. Assume that the program has at most one exit point, that is, let P be a given program with a single exit point. Let P' be the program obtained from P by adding the assert statement "assert(false)" at the end of the program. Then, P is nonterminating iff the assert statement in P' is satisfied.

As a result the weakest precondition inference may be used on the transformed program to discover most-general characterization of inputs under which the original program is non-terminating. By way of example, consider the example program 1202 shown in FIG. 12A. If assert(false) is instrumented at the end of the program, then the analyzer 102 generates the precondition $x \geq 0 \land y \geq 0$, which is one of the weakest affine conditions under which the program is non-terminating. Now consider the program 1204 shown in FIG. 12B. If assert(false) is instrumented at the end of this program, then the analyzer 102 generates the precondition $i \geq 1$. Notice that the loop guard $i \geq 0$ is not sufficient to guarantee non-termination.

As can be seen, there is thus provided a constraint-based approach to invariant generation in programs that translates a program into constraints that are solved using existing constraint solvers to yield desired program invariants. The generated constraints are Boolean combinations of quadratic inequalities over integer variables, which may be reduced to SAT formulae using bit-vector modeling, with existing SAT solvers used to solve them.

In one implementation, the constraint-based approach can be used to model a wide spectrum of program analyses in an expressive domain containing disjunctions and conjunctions of linear inequalities. Further described is modeling the problem of context-sensitive interprocedural program verification, as well as a constraint-based approach to weakest precondition and strongest postcondition inference. Also described are applications of the above analyses, including bounds analysis and generation of most-general counter-examples for both safety and termination properties.

Exemplary Operating Environment

FIG. 13 illustrates an example of a suitable computing and networking environment 1300 into which the examples of FIGS. 1-12A may be implemented. The computing system environment 1300 is only one example of a suitable computing environment and is not intended to suggest any limitation as to the scope of use or functionality of the invention. Neither should the computing environment 1300 be interpreted as having any dependency or requirement relating to any one or combination of components illustrated in the exemplary operating environment 1300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 13, an exemplary system for implementing various aspects of the invention may include a general purpose computing device in the form of a computer 1310. Components of the computer 1310 may include, but are not limited to, a processing unit 1320, a system memory 1330, and a system bus 1321 that couples various system components including the system memory to the processing unit 1320. The system bus 1321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1310 typically includes a variety of computer-readable media. Computer-readable media can be any available media that can be accessed by the computer 1310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 1330 includes computer storage media in the form of volatile and/or nonvolatile memory such as read only memory (ROM) 1331 and random access memory (RAM) 1332. A basic input/output system 1333 (BIOS), containing the basic routines that help to transfer information between elements within computer 1310, such as during start-up, is typically stored in ROM 1331. RAM 1332 typically contains data and/or program modules that are immediately accessible to and/or presently being operated on by processing unit 1320. By way of example, and not limitation, FIG. 13 illustrates operating system 1334, application programs 1335, other program modules 1336 and program data 1337.

The computer 1310 may also include other removable/non-removable, volatile/nonvolatile computer storage media. By way of example only, FIG. 13 illustrates a hard disk drive 1341 that reads from or writes to non-removable, nonvolatile magnetic media, a magnetic disk drive 1351 that reads from or writes to a removable, nonvolatile magnetic disk 1352, and an optical disk drive 1355 that reads from or writes to a removable, nonvolatile optical disk 1356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1341 is typically connected to the system bus 1321 through a non-removable memory interface such as interface 1340, and magnetic disk drive 1351 and optical disk drive 1355 are typically connected to the system bus 1321 by a removable memory interface, such as interface 1350.

The drives and their associated computer storage media, described above and illustrated in FIG. 13, provide storage of computer-readable instructions, data structures, program modules and other data for the computer 1310. In FIG. 13, for example, hard disk drive 1341 is illustrated as storing operating system 1344, application programs 1345, other program modules 1346 and program data 1347. Note that these components can either be the same as or different from operating system 1334, application programs 1335, other program modules 1336, and program data 1337. Operating system 1344, application programs 1345, other program modules 1346, and program data 1347 are given different numbers herein to illustrate that, at a minimum, they are different copies. A user may enter commands and information into the computer 1310 through input devices such as a tablet, or electronic digitizer, 1364, a microphone 1363, a keyboard 1362 and pointing device 1361, commonly referred to as mouse, trackball or touch pad. Other input devices not shown in FIG. 13 may include a joystick, game pad, satellite dish, scanner, or the like. These and other input devices are often connected to the processing unit 1320 through a user input interface 1360 that is coupled to the system bus, but may be connected by other interface and bus structures, such as a parallel port, game port or a universal serial bus (USB). A monitor 1391 or other type of display device is also connected to the system bus 1321 via an interface, such as a video interface 1390. The monitor 1391 may also be integrated with a touch-screen panel or the like. Note that the monitor and/or touch screen panel can be physically coupled to a housing in which the computing device 1310 is incorporated, such as in a tablet-type personal computer. In addition, computers such as the computing device 1310 may also include other peripheral output devices such as speakers 1395 and printer 1396, which may be connected through an output peripheral interface 1394 or the like.

The computer 1310 may operate in a networked environment using logical connections to one or more remote computers, such as a remote computer 1380. The remote computer 1380 may be a personal computer, a server, a router, a network PC, a peer device or other common network node, and typically includes many or all of the elements described above relative to the computer 1310, although only a memory storage device 1381 has been illustrated in FIG. 13. The logical connections depicted in FIG. 13 include one or more local area networks (LAN) 1371 and one or more wide area networks (WAN) 1373, but may also include other networks. Such networking environments are commonplace in offices, enterprise-wide computer networks, intranets and the Internet.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. The modem 1372, which may be internal or external, may be connected to the system bus 1321 via the user input interface 1360 or other appropriate mechanism. A wireless networking component 1374 such as comprising an interface and antenna may be coupled through a suitable device such as an access point or peer computer to a WAN or LAN. In a networked environment, program modules depicted relative to the computer 1310, or portions thereof, may be stored in the remote memory storage device. By way of example, and not limitation, FIG. 13 illustrates remote application programs 1385 as residing on memory device 1381. It may be appreciated that the network connections shown are exemplary and other means of establishing a communications link between the computers may be used.

An auxiliary subsystem 1399 (e.g., for auxiliary display of content) may be connected via the user interface 1360 to allow data such as program content, system status and event notifications to be provided to the user, even if the main portions of the computer system are in a low power state. The auxiliary subsystem 1399 may be connected to the modem 1372 and/or network interface 1370 to allow communication between these systems while the main processing unit 1320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method employing at least one processor to perform steps comprising, analyzing a program, including using invariant templates, including at least one invariant template that specifies an arbitrary Boolean combination of linear inequalities, and generating a weakest precondition using a binary search-based algorithm.

2. The method of claim 1 wherein generating second-order constraints comprises choosing a cut-set of one or more cut-points, which may or may not be loop headers, and associating an invariant template with each cut-point.

3. The method of claim 1 wherein analyzing the program comprises generating second-order constraints from the program, converting second-order logic formula based on those constraints into first-order logic formula using a corresponding template, converting the first-order logic formula into a quantifier-free formula, and converting the quantifier-free formula into a Boolean satisfiability formula.

4. The method of claim 3 wherein converting the first-order logic formula into the quantifier-free formula comprises applying Farkas' lemma, and wherein converting the quantifier-free formula into a Boolean satisfiability formula comprises using bit-vector modeling.

5. The method of claim 3 further comprising, applying off-the-shelf SAT constraint solvers to the Boolean satisfiability formula to generate program analysis results.

6. The method of claim 1 wherein analyzing the program comprises performing interprocedural analysis, including by computing procedure summaries for relations between procedure inputs and outputs structured as sets of precondition and postcondition pairs.

7. The method of claim 1 wherein analyzing the program comprises generating a weakest precondition by generating locally-weakest preconditions with respect to a given neighborhood structure.

8. The method of claim 1 wherein analyzing the program comprises generating a weakest precondition using combination of a binary search-based algorithm, and the algorithm based on generating a locally weakest precondition with respect to a given neighborhood structure.

9. The method of claim 1 wherein analyzing the program comprises determining a worst-case bound on the running time of a procedure, including by computing bounds on loop iterations or on a number of recursive procedure call invocations, or by computing bounds on both loop iterations and on a number of recursive procedure call invocations.

10. The method of claim 1 wherein analyzing the program comprises generating most-general counter-examples to termination.

11. The method of claim 1 wherein analyzing the program comprises determining most-general counter-examples to safety assertions, including determining at least one weakest precondition.

12. In a computing environment, a system comprising, at least one processor, a memory communicatively coupled to the at least one processor and including components comprising: a program analyzer that analyzes a program, including: choosing a cut-set of one or more cut-points, which may or may not be loop headers and associating an invariant template with each cut-point, wherein at least one invariant template that specifies an arbitrary Boolean combination of linear inequalities; and conversion logic that generates second-order constraints, converts second-order logic formula based on those constraints into first-order logic formula using a corresponding template, converts the first-order logic formula into a quantifier-free formula, converts the quantifier-free formula into a Boolean satisfiability formula, and generates a weakest precondition using a binary search-based algorithm.

13. The system of claim 12 further comprising, means for performing interprocedural analysis via sets of precondition and postcondition pairs.

14. The system of claim 12 further comprising, means for generating a weakest precondition by generating locally-weakest preconditions with respect to a given neighborhood structure, or both means for generating a weakest precondition using a binary search-based algorithm, and the algorithm based on generating a locally-weakest precondition with respect to a given neighborhood structure.

15. The system of claim 12 further comprising, means for determining a worst-case bound on the running time of a procedure, means for generating most-general counter-examples to termination, or means for determining most-general counter-examples to safety assertions, or any combination of means for determining a worst-case bound on the running time of a procedure, means for generating most-general counter-examples to termination, or means for determining most-general counter-examples to safety assertions.

16. One or more computer-readable storage media having computer-executable instructions, which perform steps, comprising, analyzing a program, including choosing a cut-set of one or more cut-points, which may or may not be loop headers, associating an invariant template with each cut-point, wherein at least one invariant template specifies an arbitrary Boolean combination of linear inequalities, and generating a weakest precondition using a binary search-based algorithm.

17. The one or more computer-readable storage media of claim 16 having further computer-executable instructions comprising, performing interprocedural analysis via sets of precondition and postcondition pairs.

18. The one or more computer-readable storage media of claim 16 having further computer-executable instructions comprising generating a weakest precondition based on generating locally-weakest preconditions with respect to a given neighborhood structure.

* * * * *